United States Patent [19]

Gozeling et al.

[11] 4,456,083

[45] Jun. 26, 1984

[54] BLAST FURNACE TAPHOLE DRILL

[75] Inventors: Jacobus A. Gozeling, Hoogwoud; Sibbele de Boer, Middenmeer; Abraham A. Spiering, Santpoort, all of Netherlands

[73] Assignee: Estel Hoogovens B.V., Ijmuiden, Netherlands

[21] Appl. No.: 263,083

[22] Filed: May 12, 1981

[30] Foreign Application Priority Data

May 12, 1980 [NL] Netherlands ............... 8002717

[51] Int. Cl.³ .................................. E21B 10/36
[52] U.S. Cl. ........................... 175/415; 175/417
[58] Field of Search ............... 175/414, 415, 417, 418, 175/419, 420, 329, 393, 421

[56] References Cited

U.S. PATENT DOCUMENTS

| 1,764,989 | 6/1930 | Signell et al. | 175/418 |
| 2,368,512 | 1/1945 | Zimmerman | 175/418 X |
| 2,634,954 | 4/1953 | Eakin | 175/418 X |
| 2,641,446 | 6/1953 | Haglund et al. | 175/417 X |
| 2,879,973 | 3/1959 | Saxman | 175/418 X |
| 3,128,836 | 4/1964 | Hjälsten et al. | 175/420 X |
| 3,726,351 | 4/1973 | Williams | 175/421 X |

Primary Examiner—Ernest R. Purser
Assistant Examiner—Michael Starinsky
Attorney, Agent, or Firm—Jon M. Lewis

[57] ABSTRACT

A blast furnace taphole drill has a flaring head (3) with cutting edges (5) at its cutting end formed by intersecting angled faces. A central bore (4) carries cleaning air to the cutting end. To prevent blockage of the cleaning air bore (4) by debris and possible jamming of the drill, the head has deep radial grooves (6) formed at the bottoms of the valley shapes between the cutting edges (5). The grooves (6) extend radially from the air bore (4) and conduct the air so that it can get behind or under jammed debris. Reduced taphole drilling times can be achieved.

3 Claims, 2 Drawing Figures

BLAST FURNACE TAPHOLE DRILL

BACKGROUND OF THE INVENTION

1. Field of the Invention

The present invention relates to a blast furnace taphole drill of the type with hammer action and air-cleaning used for drilling a taphole in the lining of a blast furnace. Drills according to this invention have a flaring head, the end face of which is provided with radial cutting edges formed by the intersection of flat faces which are angled to each other. An axial central passage extends through the head for the cleaning air.

2. Description of the Prior Art

In blast furnace operation, molten pig iron is tapped off at intervals by drilling a taphole in the lining of the furnace, the taphole being about 50 to 60 mm wide and, depending on the construction of the furnace, about 2 to 3 meters long. Once sufficient pig iron has been tapped from the furnace, the taphole is re-closed by packing in a refractory compound which when heated by heat from the furnace, hardens to form a monolithic structure with the area surrounding the hole. For subsequent tapping, a new taphole is drilled at the same site. Tapping time is dependent on the construction of the taphole drill, the type of blast furnace, the number of tapholes per furnace and on the manner in which the furnace is operated. For a medium sized furnace, a tapping time of about 30 minutes is typical.

When drilling with a taphole drill of the type described above, the hammer action is largely applied to the refractory lining, which becomes crushed in places as a result. In addition, a slow rotation is applied to the drill, so that each successive impact is applied to the refractory material in a different place. At the same time compressed air at a pressure of, for example, six atmospheres is delivered via the axial passage through the drill in order to remove crushed refractory material from the hole being formed.

Although the taphole drill can be operated under a variety of conditions, a hammer action of about 30 impacts per second and a drill rotation speed of a few revolutions per second is normal. This permits drilling of a 2½ meter taphole in 10 to 12 minutes. However, there is a risk that the drill jams, and this means that it has to be withdrawn from the hole and replaced. Jamming of the drill is generally caused by blockage of the air passage or the hole formed by the drill in the vicinity of the drill head with refractory dust. This type of blockage makes removal of the dust impossible and causes the drill to run hot.

Taphole drills and the drive shaft are generally made in one piece, although designs are known where a removable head is bolted to a shaft. Because of the high temperatures at which the drill has to operate, especially towards the end of the drilling procedure, it is not practical to construct the drill from very high-grade and expensive materials. On the contrary, commercial grade steel with a tensile strength of 50 kg/mm$^2$ is generally used for this purpose.

The problem of ensuring flow of the cleaning fluid has been considered in drills designed for other purposes. U.S. Pat. No. 3,605,924 discloses a drill having cutting inserts in which axially extending drainage grooves are provided at the periphery of the head and branch passages from the central air passage open into these drainage grooves. FR No. 978,749 discloses a similar construction, as does U.S. Pat. No. 2,368,512 for a drill used for cutting rock and having cutting edges in one piece with the drill head. Also of interest is U.S. Pat. No. 4,047,514 which relates specifically to a furnace taphole drill.

In a drill designed for drilling earth formations, having a flat end face with a large number of domed inserts protruding from it, GB No. 1,465,560 shows three shallow flushing grooves extending across the end face from the end of an air passage. Two of these grooves are not radial, since the end of the air passage is eccentric.

SUMMARY OF THE INVENTION

The object of the present invention is to provide a taphole drill for a blast furnace which is capable of use in the conditions prevailing and with which jamming of the drill is eliminated or minimized. A further object is that of reducing the time required for drilling.

Reducing the drilling time provides an increase in the time available for tapping and this can lead to substantially smoother operation, particularly in blast furnaces which are operated with high top pressure and high hot blast temperatures. At the same time it is possible with controlled tapping times to operate the furnace in such a way that the hearth does not run so full with pig iron. All this means that the furnace can be operated under conditions which lead to increased production of pig iron.

The invention as claimed is intended to provide a solution. In practical use of a drill embodying the invention, it has been found that drilling time can be cut to less of half than the time required by a conventional drill. In the case of furnaces with a single taphole, this can lead to a 15% increase in production.

The present invention provides deep grooves between the cutting edges extending outwards from the central air passage. Even if large quantities of refractory waste are formed during the drilling process, the compressed air should be able to escape through the base of these grooves at all times. Risk of jamming is thus precluded or minimized. When large quantities of refractory waste form, the compressed air is not blown in radial directions against all the dust and waste which has formed, thereby permitting the waste and dust to lodge against the cutting edges of the drill and consequently also in the central air passage; instead the compressed air flowing through the deep radial grooves will, as it were, dig up and remove from below the blockage which has formed.

Good results have been achieved in particular with grooves which taper towards their bottoms and which have a width and depth respectively of 7 to 13% and 20 to 40% respectively of the maximum diameter of the drill head. Indeed, as a result of the shape of these grooves, virtually no waste is able to collect in them. Good results are achieved in particular where the shape of the grooves is such that their width and depth are equivalent to 10% and about 30% respectively of the maximum diameter of the drill head.

Although the invention can be applied to taphole drills with fewer than or more than four cutting edges, particularly good results have nevertheless been obtained with drills with four cutting edges.

The shape of the drill head, including the grooves, can be made by pressing, forging or forming. It is also possible to make the cutting head first without the deep grooves, for example by pressing, forging or forming, and then to cut these grooves with a grinding disc.

BRIEF INTRODUCTION OF THE DRAWINGS

The preferred embodiment of the invention will now be described by way of non-limitative example with reference to the accompanying drawing, in which.

DESCRIPTION OF THE PREFERRED EMBODIMENT

Figure 1B:
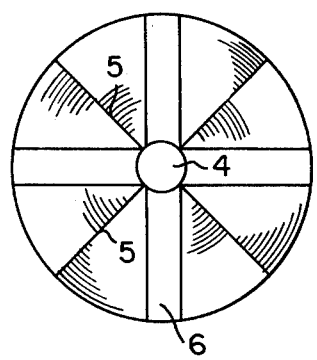
FIG. 1b is an end view of the blast furnace taphole drill according to the present invention.

In the drawing, there is shown part of the shaft 1 of the taphole drill through which an axial central air passage 2 extends. The shaft 1 is approximately 4 meters long and 42 mm in diameter.

The end of the shaft 1 is forged to form head 3 which flares towards its end face and through which the compressed air passage 2, after reduction in diameter continues to open at the end face of the drill in the form of the air passage 4. The maximum diameter of the drill illustrated as an example is 55 mm.

Figure 1A:
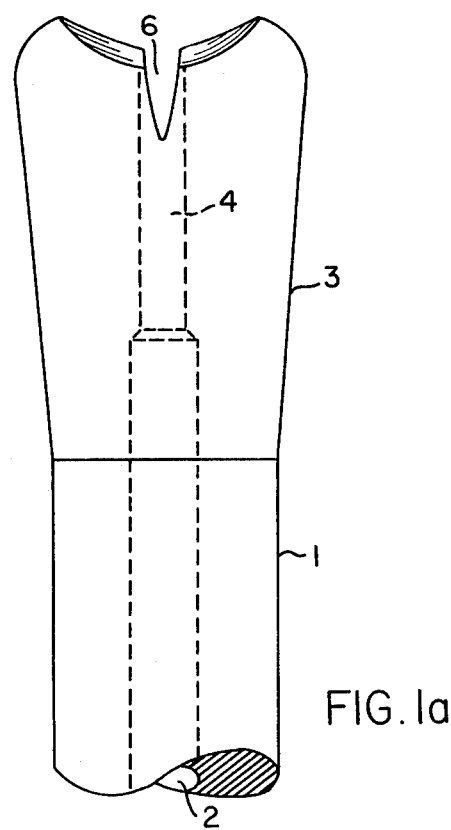
FIG. 1a is a side view.

The end face 4 has four cutting edges 5, formed by flat faces which are at right angles to each other so that they intersect. The cutting edges 5 are integral with the remainder of the drill head 3. Between adjacent pairs of the cutting edges 5 there are thus valley like formations. Deep grooves 6 are provided at the bottom of the valley formations. At their mouths at the end face of the drill these grooves 6 are for example 5 mm wide and they taper downwardly over their depth of about 15 mm. As FIG. 1a shows, the grooves 6 open at their radially inner ends into the air passage 4 and at their radially outer ends at the periphery of the drill heads. The function of these deep grooves 6 in preventing jamming has been described above.

What is claimed is:

1. In a blast furnace taphole drill, of the type operated with both hammer action and air cleaning, said drill including a flaring head of a predetermined diameter, a head end face having four radially extending cutting edges formed by the intersection of flat faces angled to each other, said radial cutting edges defining valleys thereinbetween and a central axial air passage ending at said head end face, the improvement to said taphole drill comprising: air passages in the form of a wedge-shaped deep groove formed on said end face at the bottom of each said valley, each said groove extending radially outwardly from said central axial air passage and extending inwardly into said flaring head from said head end face, each said groove also tapering in width toward the bottom thereof and having a width at the mouth thereof and an axial depth which are respectively in the range of 7 to 13% and 20 to 40% of the predetermined diameter of said taphole drill.

2. Drill according to claim 1 wherein the width of the grooves at their mouths and their depth are respectively about 10% and about 30% of the maximum diameter of the drill head.

3. Drill according to claim 1 wherein said cutting edges are formed integrally with the remainder of said head.

* * * * *